(12) United States Patent
Ichikawa

(10) Patent No.: US 10,644,634 B2
(45) Date of Patent: May 5, 2020

(54) ELECTRIC POWER TOOL

(71) Applicant: MAKITA CORPORATION, Anjo-shi, Aichi-ken (JP)

(72) Inventor: Yoshitaka Ichikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 15/266,635

(22) Filed: Sep. 15, 2016

(65) Prior Publication Data

US 2017/0093321 A1 Mar. 30, 2017

(30) Foreign Application Priority Data

Sep. 30, 2015 (JP) ................................. 2015-193778

(51) Int. Cl.
*H02P 27/08* (2006.01)
*H02P 6/08* (2016.01)
*H02P 6/14* (2016.01)

(52) U.S. Cl.
CPC .............. *H02P 27/08* (2013.01); *H02P 6/085* (2013.01); *H02P 6/14* (2013.01); *H02P 27/085* (2013.01)

(58) Field of Classification Search
CPC ........................................................ H02P 6/14
USPC ........................................................ 318/139
See application file for complete search history.

(56) References Cited

U.S. PATENT DOCUMENTS

2002/0158600 A1 10/2002 Seima et al.
2004/0012353 A1* 1/2004 Seima ....................... H02P 1/40
318/432

2009/0108781 A1 4/2009 Maeda
2012/0152583 A1* 6/2012 Yanagihara ............ B23D 47/12
173/217
2013/0278189 A1* 10/2013 Yamaguchi ....... H02M 7/53875
318/400.02

(Continued)

FOREIGN PATENT DOCUMENTS

JP 2002-272162 A 9/2002
JP 2008-072788 A 3/2008

(Continued)

OTHER PUBLICATIONS

Mar. 19, 2019 Office Action issued in Japanese Patent Application No. 2015-193778.

*Primary Examiner* — Jorge L Carrasquillo
*Assistant Examiner* — Devon A Joseph
(74) *Attorney, Agent, or Firm* — Oliff PLC

(57) ABSTRACT

An electric power tool in one aspect of the disclosure comprises an operation unit, a bridge circuit having a plurality of switching elements, and a control unit. The control unit is configured to select from the plurality of switching elements a pair of switching elements forming a current path of a motor. The control unit selectively executes one of non-complementary PWM in which one of the selected switching elements is turned on and the other turned on/off, and complementary PWM in which, in addition to the same control as that of the non-complementary PWM, a switching element connected to the same terminal of the motor as the other of the selected switching elements is turned on/off so that an on/off state of the switching element is reversed to that of the other of the selected switching elements.

17 Claims, 12 Drawing Sheets

(56) References Cited

U.S. PATENT DOCUMENTS

2017/0093312 A1* 3/2017 Hano ...................... H02P 6/085
2017/0141713 A1* 5/2017 Mori ......................... H02P 6/14

FOREIGN PATENT DOCUMENTS

JP      2009-261223 A    11/2009
JP      2012-130980 A    7/2012

* cited by examiner

ELECTRIC POWER TOOL

CROSS-REFERENCE TO RELATED APPLICATIONS

This application claims the benefit of Japanese Patent Application No. 2015-193778 filed Sep. 30, 2015 in the Japan Patent Office, the entire disclosure of which is incorporated herein by reference.

BACKGROUND

The present disclosure relates to a control device of a motor configured to apply PWM (pulse width modulation) control to switching elements inside a bridge circuit that form a current path to the motor, and an electric power tool provided with the control device.

The control device comprises a bridge circuit having a plurality of switching elements (a plurality of high-side switches and a plurality of low-side switches) between a plurality of terminals of the motor and positive and negative electrodes of a direct current (DC) power source.

The control device, when the motor is driven, selects a high-side switch and a low-side switch to be use to form a current path, depending on a rotation position of the motor, and holds one of the switches in an ON state and alternately turns on/off the other by a PWM signal having a predetermined duty ratio. Thereby, electric current flowing to the motor is PWM controlled.

Also known is a PWM control method which not only turns on/off a switching element on a current path from a DC power source to a motor by a PWM signal, but turns on/off a switching element connected to the same motor terminal as that switching element in a reverse phase.

This control method is called complementary PWM, which is, for example, disclosed in Japanese Unexamined Patent Application Publication No. 2009-261223. The complementary PWM can suppress temperature rise of a bridge circuit, as compared to non-complementary PWM which turns on/off one switching element by a PWM signal.

Diodes are connected in parallel to the switching elements inside the bridge circuit. The diodes corresponding to the respective switching elements are used to flow electric current deriving from energy stored in motor winding from a negative electrode toward a positive electrode of the DC power source, when the current path to the motor is interrupted by other switching elements.

In the non-complementary PWM, when the switching element to be turned on/off by the PWM signal is turned off, electric current flows through a diode connected to the same motor terminal as that switching element, so that electric current continues to flow to the motor winding.

When electric current flows to the diode as such, the diode is heated by internal resistance. Temperature rise occurs in the switching element (and the bridge circuit) provided with the diode.

In contrast, in the complementary PWM, when the switching element on the current path from the DC power source to the motor is turned off by a PWM signal, a switching element connected to the same motor terminal as that switching element is turned on, and electric current flows to the turned-on switching element.

As a result, according to the complementary PWM, electric current flowing through the diode is suppressed, temperature rise of the switching element (and the bridge circuit) caused by heat generation of the diode is suppressed.

SUMMARY

In the complementary PWM, when one of the switching elements on the current path to the motor is turned off by a PWM signal, a switching element connected to the same motor terminal as that switching element, and the other of the switching elements on the current path are turned on.

In this state, a closed loop is formed by the two turned-on switching elements (two high-side switches or two low-side switches) and the motor winding. Electric current is refluxed within the closed loop.

In this closed loop, electric current can not only flow forward to drive the motor but also flow in a reverse direction to brake the motor.

Accordingly, when the motor is rotating at the time when the motor starts to be driven, and if a duty ratio of the PWM signal is smaller than a duty ratio that matches a rotation speed of the motor, electric current in the reverse direction flows to the above closed loop due to an induced voltage generated by rotation of the motor after a reflux of a driving current is ended.

Electric current in the reverse direction is a braking current that generates a braking force on the motor. When on/off switching of the PWM signal is performed while the braking current flows, electric current is unable to be refluxed in the above closed loop. Regenerative current flows to the power source, and a power supply voltage is increased.

In one aspect of the present disclosure, in a control device that drives a motor in the complementary PWM, such as a control device provided in an electric power tool, it is desirable to be able to suppress increase in power supply voltage due to flow of a regenerative current when the motor is driven.

A control device of motor according to one aspect of the present disclosure comprises: an operation unit configured to input a drive command of the motor; a bridge circuit having a plurality of switching elements for switching a current path to the motor; and a control unit. Each of the plurality of switching elements may be provided between positive and negative electrodes of a DC power source and a plurality of terminals of the motor.

The control unit is configured to PWM control electric current flowing to the motor when the drive command is input from the operation unit. According to one aspect of the present disclosure, the control unit may, depending on a rotation position of the motor, selects from among the plurality of switching elements a pair of switching elements forming the current path of the motor extending from the positive electrode to the negative electrode of the DC power source inside the bridge circuit. The control unit turns on one of the selected switching elements, and alternately turns on/off the other of the selected switching elements by a PWM signal.

As a result, electric current flowing to the motor (and hence a rotational state of the motor) is controlled in accordance with a duty ratio of the PWM signal (PWM control).

According to one aspect of the present disclosure, the control unit selectively executes one of non-complementary PWM and complementary PWM as the PWM control.

In the non-complementary PWM, the control unit alternately turns on/off by the PWM signal only the other of the selected switching elements, among the plurality of switching elements inside the bridge circuit.

In the complementary PWM, the control unit alternately turns on/off by the PWM signal the other of the selected switching elements, among the plurality of switching elements inside the bridge circuit. Further, the control unit turns on/off a switching element connected to the same terminal of the motor as the other of the selected switching elements so that an on/off state of the switching element is reversed to that of the other of the selected switching elements.

Thus, according to the control device of a motor according to one aspect of the present disclosure, the control unit is configured to selectively execute one of the complementary PWM and the non-complementary PWM, as the PWM control of the motor.

For example, the control unit, under a condition that a regenerative current flows in the complementary PWM as described above, can be configured to execute the non-complementary PWM. According to this configuration, the regenerative current is reduced, and increase in power supply voltage is suppressed.

According to one aspect of the present disclosure, switching of the motor control (i.e., switching between the non-complementary PWM and the complementary PWM) by the control unit may be performed based on a state of the motor.

The control unit, when the operation unit is operated, may be configured to switch the control of the motor based on the state of the motor.

For example, the control unit, if the motor is rotating when the operation unit is operated, may be adapted to execute the non-complementary PWM.

Such a control of the motor can suppress driving of the motor by the complementary PWM in a state that the motor is rotating, when the drive command is input from the operation unit to start driving of the motor.

Accordingly, flow of a regenerative current and increase in power supply voltage, due to execution of the complementary PWM by the PWM signal having a smaller duty ratio than the duty ratio that matches a rotation speed of the motor while the motor is rotating, can be suppressed.

The control unit may be configured to execute the complementary PWM, unless the motor is rotating when the operation unit is operated.

The control unit may be configured to switch the control of the motor to the complementary PWM, when a switching condition to the complementary PWM is satisfied during the non-complementary PWM control of the motor.

According to this configuration, while generation of a regenerative current is suppressed, the complementary PWM can be executed. Therefore, the effect obtained by the complementary PWM is advantageously exerted.

The complementary PWM can suppress heat generation of the diode connected in parallel with the switching element in the bridge circuit, and temperature rise in the switching element, and hence the bridge circuit.

According to one aspect of the present disclosure, the control unit may be configured to switch the control of the motor to the complementary PWM when driving time of the motor is longer than a set time.

The control unit may be configured to switch the control of the motor to the complementary PWM, when elapsed time since the drive command is input from the operation unit is longer than a set time.

As the driving time of the motor and the elapsed time from input of the drive command become longer, the rotation speed of the motor is controlled, by the non-complementary PWM in the meantime, to a rotation speed that corresponds to the duty ratio of the PWM signal. Therefore, switching to the complementary PWM can suppress generation of a regenerative current.

As such, the switching condition to the complementary PWM may be set using the motor drive time and the elapsed time from the drive command input. Setting such condition can suppress flow of a regenerative current after switching to the complementary PWM, and also suppress increase in the power supply voltage.

The control unit may be configured to determine whether the switching condition of the PWM control is satisfied based on electric current flowing to the motor.

For example, the control unit may be configured to switch the control of the motor to the complementary PWM, when electric current flowing to the motor becomes equal to or greater than a preset threshold current.

It is considered that, once electric current flowing to the motor is equal to or greater than the threshold current, the rotation speed of the motor rises to a rotation speed corresponding to the drive command, and the motor is driven at a rotation speed corresponding to the duty ratio of the PWM signal.

Therefore, even if the switching condition to the complementary PWM is set based on electric current flowing to the motor, a regenerative current after switching to the complementary PWM can be suppressed, and increase in the power supply voltage can be suppressed.

The control unit may be configured to determine whether the switching condition is satisfied based on the rotation speed of the motor. For example, the control unit may be configured to switch the control of the motor to the complementary PWM when the rotation speed of the motor becomes greater than a rotation speed at the time when the motor starts to be driven.

It is considered that, when the rotation speed of the motor is greater than the rotation speed when the motor starts to be driven, the motor is driven at a rotation speed corresponding to the duty ratio of the PWM signal.

Therefore, even if the switching condition to the complementary PWM is set based on the rotation speed of the motor, a regenerative current after switching to the complementary PWM can be suppressed, and increase in the power supply voltage can be suppressed.

The operation unit may be configured to be able to input a speed command for commanding the rotation speed of the motor as the drive command of the motor. In this case, the control unit may be configured to switch the control of the motor between the non-complementary PWM and the complementary PWM based on the speed command from the operation unit.

The control unit may be configured to switch the control of the motor from the complementary PWM to the non-complementary PWM when the speed command from the operation unit is one of a command to stop and a command to decelerate the rotation of the motor.

When a command from the operation unit is a command to stop or decelerate the rotation of the motor, the motor is decelerated (brake controlled).

If the control of the motor is switched to the non-complementary PWM during the deceleration operation, driving of the motor can be resumed by the non-complementary PWM when a command to accelerate (increase) the rotation of the motor is input from the operation unit at a later time.

Therefore, when the driving of the motor is restarted during deceleration operation of the motor, execution of the complementary PWM using the PWM signal of a smaller duty ratio than the duty ratio that matches the rotation speed of the motor can be suppressed. Therefore, flow of a regenerative current can be suppressed, and increase in the power supply voltage can be suppressed.

The control unit may be configured to correct the duty ratio of the PWM signal, when the control of the motor is switched to one of the non-complementary PWM and the complementary PWM, so that a ratio of on/off time of the other of the selected switching elements is not to be changed.

The correction can suppress fluctuation of electric current flowing to the motor due to change in the ratio of the on/off time (duty ratio) of the other of the selected switching elements when the control method of the PWM control is switched from the non-complementary PWM to the complementary PWM, or vice versa.

In the complementary PWM, dead time can be set to the PWM signal of the respective switching elements so that two switching elements which are turned on/off by the PWM control (high-side switch and low-side switch) are not turned on at the same time.

Therefore, when the control of the motor is switched between the non-complementary PWM and the complementary PWM, the ratio of the on/off time (duty ratio) of the other of the selected switching elements may vary by the switching.

In contrast, correction of the duty ratio of the PWM signal as described above can suppress change in the ratio of the on/off time (duty ratio) of the other of selected switching elements upon switching the control of the motor. Therefore, fluctuation of electric current flowing to the motor can be suppressed.

BRIEF DESCRIPTION OF THE DRAWINGS

Exemplary embodiments of the present disclosure will be described in the following by way of example with reference to the accompanying drawings in which.

DETAILED DESCRIPTION OF THE PREFERRED EMBODIMENTS

Figure 1:
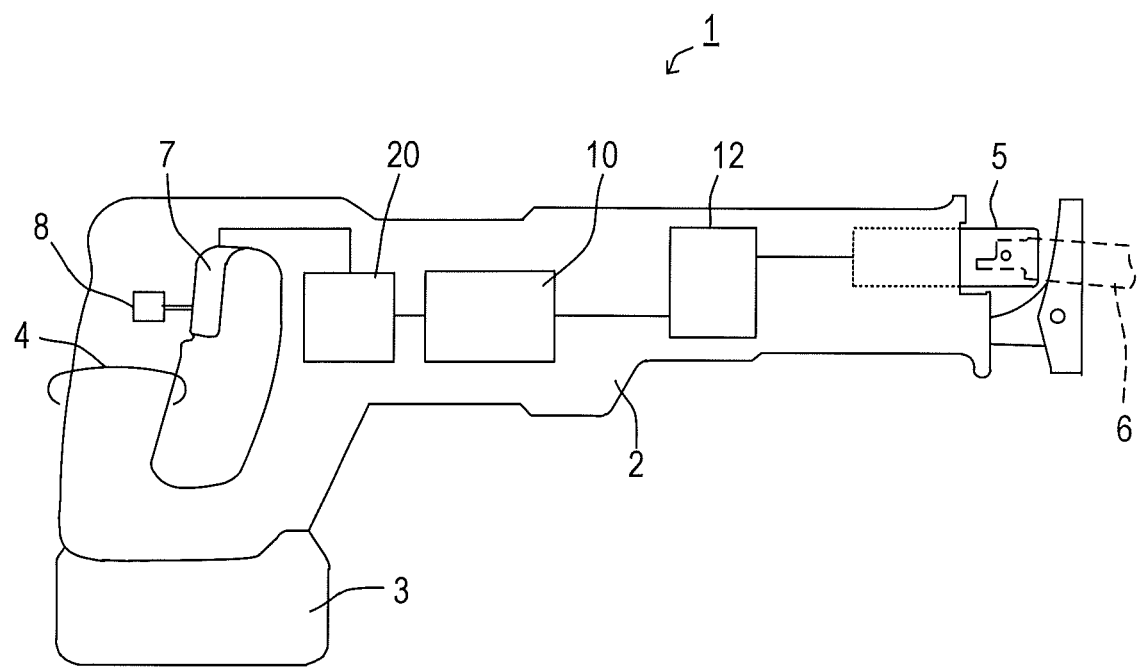
FIG. 1 is an explanatory view illustrating a schematic configuration of an electric power tool according to embodiments.

As shown in FIG. 1, an electric power tool 1 of the present embodiment is a reciprocating saw that is utilized to cut a workpiece such as wood or metal. The electric power tool 1 comprises a tool body 2, and a battery pack 3. The battery pack 3 is configured to be attachable to and detachable from an end of the tool body 2. FIG. 1 shows the battery pack 3 mounted to the tool body 2.

The tool body 2 comprises a grip 4, a blade folder 5, a blade 6, a trigger 7, a lock off button 8, a motor 10, a transmission mechanism 12, and a motor drive circuit 20. Among them, the motor 10, the transmission mechanism 12 and the motor drive circuit 20 are accommodated inside a housing of the tool body 2.

The grip 4 is a portion to be gripped upon use by hand of a user of the electric power tool 1. The blade 6 is an elongated thin plate-like metal member for cutting a workpiece. The blades 6 is removably fixed, at one longitudinal end thereof, to the blade folder 5 that protrudes from the housing of the tool body 2.

A saw blade is formed on one side along a longitudinal direction of the blade 6. When the blade folder 5 reciprocally moves in the longitudinal direction of the blade 6 by a rotation force of the motor 10, the blade 6 is reciprocally driven. As a result, a workpiece is cut.

The trigger 7 is an operation unit operated by the user to command reciprocating drive of the blade 6 (in other words, driving of the motor 10). When the user pulls the trigger 7, a trigger switch 22 inside the housing of the tool body 2 (see FIG. 2) is turned on. As a result, the motor 10 rotates to activate (reciprocating drive) the blade 6.

The lock off button 8 is a button for permitting or prohibiting pulling operation of the trigger 7. When the lock off button 8 is changed to a state corresponding to "locked", pulling operation of the trigger 7 is prohibited. When the lock off button 8 is changed to a state corresponding to "unlocked", pulling operation of the trigger 7 is permitted.

The motor 10 rotates by electric power from the battery pack 3. The rotational force of the motor 10 is transmitted to the blade 6 via the transmission mechanism 12 and the blade folder 5. The transmission mechanism 12 converts rotational movement of the motor 10 to linear movement, and transmits the linear movement to the blade folder 5 (and hence the blade 6).

A driving speed of the blade 6 and a rotation speed of the motor 10 are in substantially linear relationship. The greater the rotation speed of the motor 10 is, the greater the driving speed of the blade 6 is.

The motor drive circuit 20 receives power supply from the battery 30 inside the battery pack 3, and controls driving of the motor 10. According to the present embodiment, the motor 10 is a three-phase brushless motor.

Figure 2:
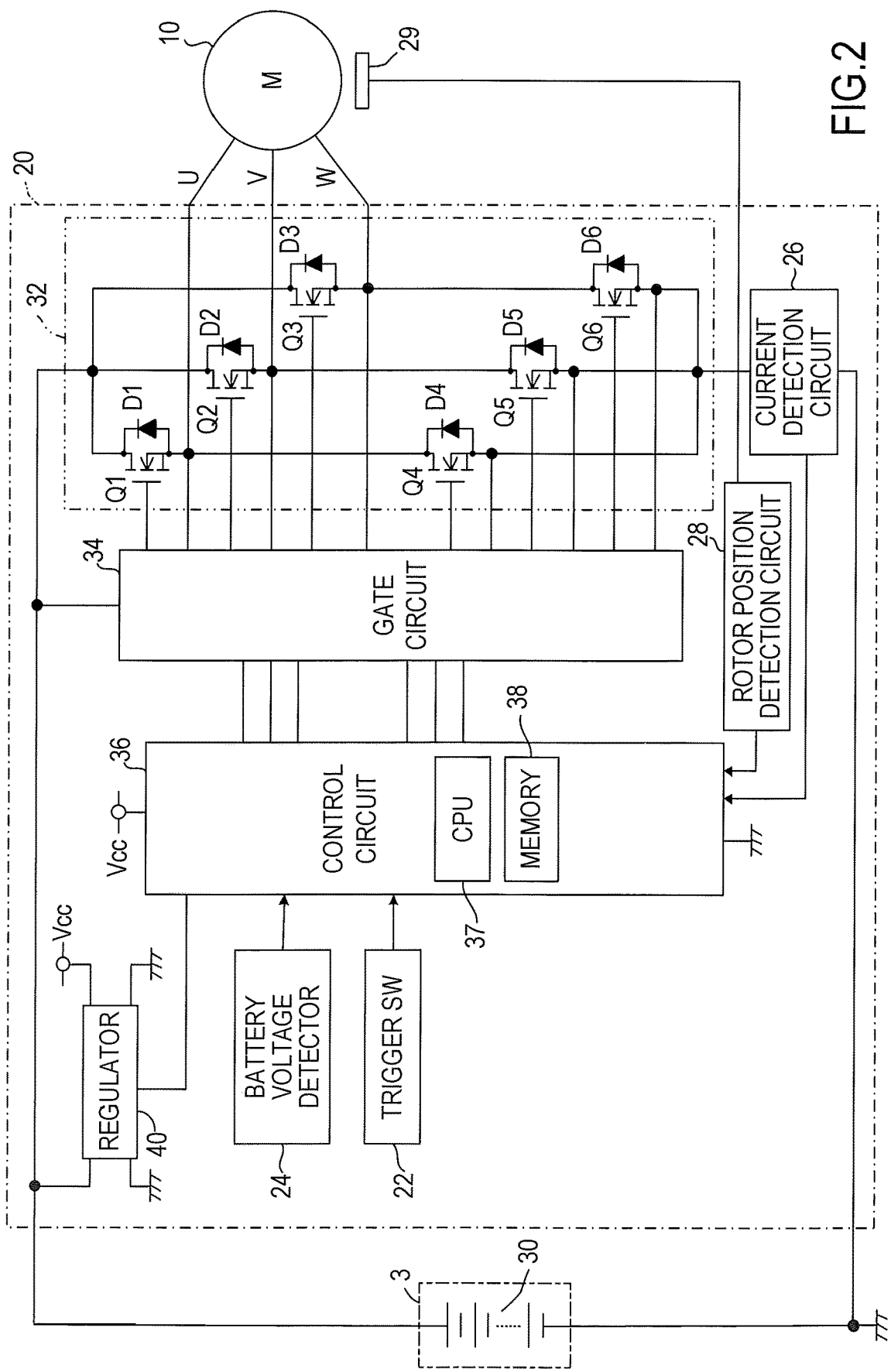
FIG. 2 is a block diagram showing a configuration of a motor drive circuit provided in the electric power tool.

As shown in FIG. 2, the motor drive circuit 20 comprises a bridge circuit 32, a gate circuit 34, a control circuit 36, and a regulator 40.

The bridge circuit 32 receives power supply from the battery 30, and is disposed so as to flow a current to each phase winding of the motor 10. The bridge circuit 32 of the present embodiment is configured as a three-phase full-bridge circuit having six switching elements Q1 to Q6.

In the bridge circuit 32, three switching elements Q1 to Q3 are provided between respective terminals U, V, and W of the motor 10 and a power supply line connected to a positive electrode of the battery 30 (positive electrode side power supply line), as high side switches.

The other three switching elements Q4 to Q 6 are provided between respective terminals U, V, and W of the motor 10 and a ground line connected to a negative electrode of the battery 30 (negative electrode side power supply line), as low-side switches.

The switching elements Q1 to Q6 are configured by n-channel MOSFETs. Between drains and sources of the FETs configuring the switching elements Q1 to Q6, diodes D1 to D6 (so-called parasitic diode) are respectively connected in parallel in a forward direction from the source toward the drain.

Each of these diodes D1 to D6 can flow electric current in a reverse direction to a positive direction, when the corresponding one of switching element Q1 to Q6 is turned off. The positive direction is a direction of electric current from the positive electrode to the negative electrode of the battery 30.

The gate circuit 34 turns on/off each of the switching elements Q1 to Q 6 in the bridge circuit 32 in accordance with a control signal output from the control circuit 36. As a result, electric current flows to each of the phase windings of the motor 10, and the motor 10 is rotated.

The control circuit 36 comprises a MCU (Micro Control Unit) mainly including a CPU 37, a ROM, and a RAM. The control circuit 36 controls driving and braking of the motor 10 via the gate circuit 34.

The control circuit 36 includes a nonvolatile memory 38 for storing states (abnormality) of the motor 10 to be controlled and the motor drive circuit 20. The memory 38 may store a program to be executed by the CPU 37. Alternatively, the control circuit 36 may be implemented by an ASIC (Application Specified Integrated Circuit), a programmable logic device such as FPGA (Field Programmable Gate Array), or a combination of the foregoing.

A trigger switch (hereinafter, switch is described as SW) 22, a battery voltage detector 24, a current detection circuit 26 and a rotor position detection circuit 28 are connected to the control circuit 36.

The trigger SW 22 is configured to be held in an ON state when the trigger 7 is operated, so that a resistance value is changed in accordance with an operation amount (pulling amount) of the trigger 7. The operation amount of the trigger 7 corresponds to a speed command to command the rotation speed of the motor 10. The control circuit 36 executes the PWM control for the motor 10 based on an input signal from the trigger SW 22 that corresponds to the resistance value, so that the motor 10 is rotated at a rotation speed corresponding to the operation amount of the trigger 7. The speed command at the time when the operation amount of the trigger 7 is changed to zero corresponds to the command to stop or decelerate the rotation of the motor.

The battery voltage detection unit 24 is configured to detect a battery voltage input from the battery pack 3 to the motor drive circuit 20.

The current detection circuit 26 is provided on a current path to the motor 10 which extends from the bridge circuit 32 to the ground line, and detects electric current flowing to the motor 10.

The rotor position detection circuit 28 detects a rotation position (in other words, rotation angle) of the motor 10 based on a detection signal from a rotation sensor 29 provided in the motor 10.

The rotation sensor 29 comprises three Hall sensors disposed around a rotor of the motor 10. Hall signals corresponding to U-phase, V-phase, and W-phase of the motor 10, of which an increase or decrease direction is reversed each time the rotor rotates electrical angle of 180 degrees, are respectively output from the three Hall sensors.

The rotor position detection circuit 28 shapes waveforms of the Hall signals of these phases U, V, and W, and generates pulsed Hall signals (see FIG. 6), of which polarity is reversed every electrical angle of 180 degrees of the rotor. The rotation position of the motor 10 (specifically, rotor) is detected at intervals of electrical angle of 60 degrees based on edges of the waveform-shaped Hall signals of the phases U, V, and W.

The waveform-shaped Hall signals of the phases U, V, and W are input to the control circuit 36 from the rotor position detection circuit 28. The control circuit 36 detects the rotation position of the motor 10 from a signal level of each of the Hall signals.

The regulator 40 receives power supply from the battery 30, and generates an operating power supply voltage (direct current (DC) constant voltage) for each part of the motor drive circuit 20. Each part of the motor drive circuit 20, including the control circuit 36, operates with the operating power supply voltage received from the regulator 40 as a power source.

Now, a description will be given on a control process executed by the control circuit 36 to control driving and braking of the motor 10. In the present embodiment, the motor drive circuit 20 corresponds to an example of a control device of motor of the present disclosure, and the control circuit 36 functions as an example of a control unit of the present disclosure.

Figure 3:
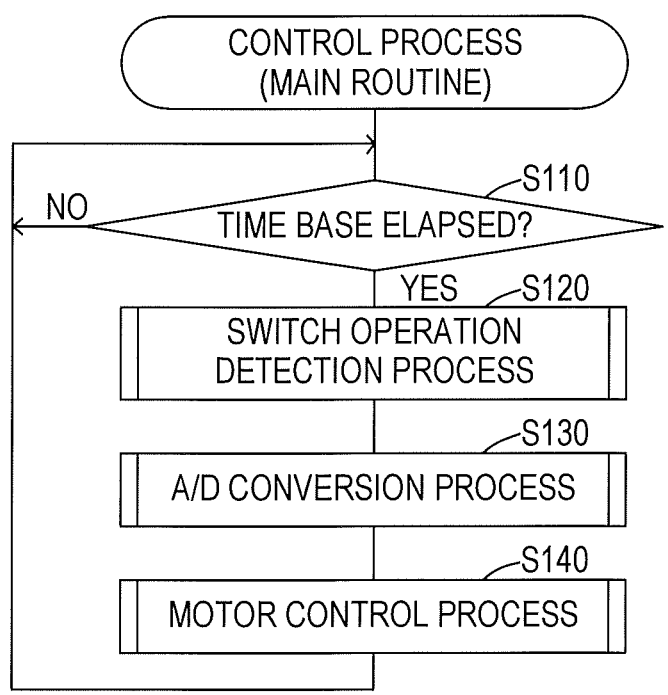
FIG. 3 is a flowchart showing a control process executed for motor control by a control circuit.

As shown in FIG. 3, the control circuit 36 repeatedly executes a series of processing shown by S120 to S140 (S denotes a step) at a predetermined control cycle (time base).

The control circuit 36, in S110, waits for a predetermined control period to elapse while determining whether the time base has elapsed. If it is determined in S110 that the time base has elapsed, the process proceeds to S120.

In S120, the control circuit 36 executes a switch operation detection process. In the detection process, an ON/OFF state of the trigger SW 22 is checked. As a result, operation of the trigger SW 22 by the user is detected. Then, the process proceeds to S130.

In S130, the control circuit 36 executes an A/D conversion process. In the conversion process, a signal representing the operation amount of the trigger 7, as well as detection signals from the battery voltage detector 24 and the current detection circuit 26, are A/D converted and read. The signal representing the operation amount of the trigger 7 is input when the trigger SW 22 is in the ON state.

In subsequent S140, the control circuit 36 executes a motor control process. In the motor control process, driving and braking of the motor 10 is controlled based on the ON/OFF state of the trigger SW 22, the operation amount of the trigger 7, the battery voltage, and electric current, read in S120 and S130, and so on. Then, the process proceeds to S110.

Figure 4:
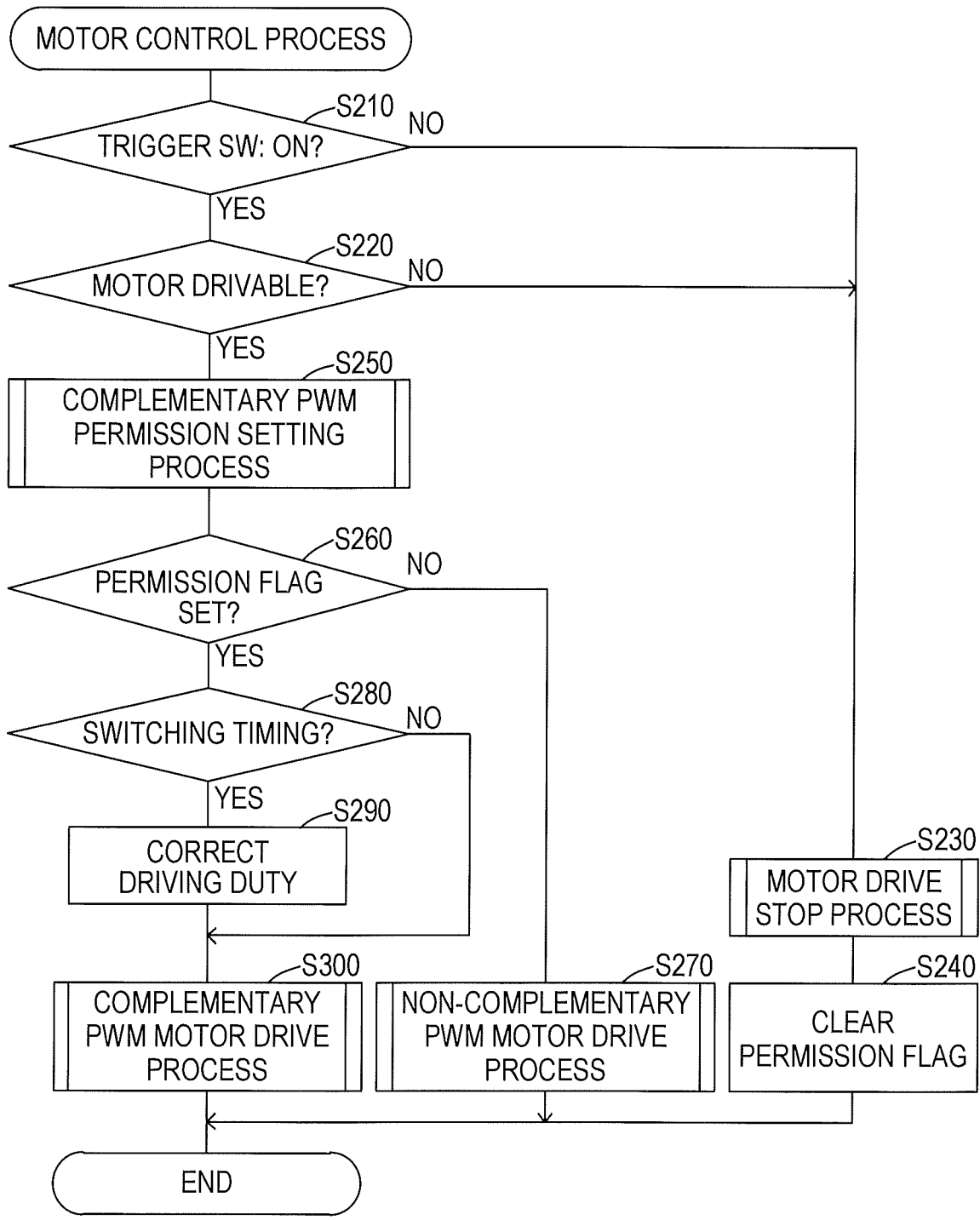
FIG. 4 is a flowchart showing details of a motor control process shown in FIG. 3.

As shown in FIG. 4, in the motor control process, it is determined in S210 whether the trigger SW 22 is in the ON state. If the trigger SW 22 is not in the ON state, a drive command of the motor 10 has not been input from outside (user). The process proceeds to S230.

In S210, if it is determined that the trigger SW 22 is in the ON state, the process proceeds to S220. In S220, the control circuit 36 determines whether the motor 10 can be driven based on the above-mentioned battery voltage and electric current. When it is determined that the motor 10 can be driven, the process proceeds to S250. If it is determined that the motor cannot be driven, the process moves to S230.

In S230, the control circuit 36 determines from changes of the above-mentioned Hall signals whether the motor 10 is currently rotating. If the motor 10 is rotating, the control circuit 36 executes a motor drive stop process in which a braking current flows to the motor 10 to generate a braking force, until the rotation of the motor 10 is stopped. In subsequent S240, the control circuit 36 clears a complementary PWM permission flag to be described later, and terminates the motor control process.

In the motor drive stop process (S230), for example, when the trigger SW 22 is turned off, soft brake according to a two-phase short-circuit brake is executed. Then, if either a predetermined period of time elapses, or the motor 10 is decelerated to a predetermined rotation state, brake control is switched from the soft brake to a three-phase short circuit brake, and the motor 10 is stopped.

The complementary PWM permission flag is a flag representing whether to permit complementary PWM control upon driving the motor 10.

In S250, the control circuit 36 executes a complementary PWM permission setting process. In the complementary PWM permission setting process, the control circuit 36 determines whether to permit execution of the complementary PWM, based on the state of the motor 10. If execution of the complementary PWM is permitted, the complementary PWM permission flag is set.

Figure 5:
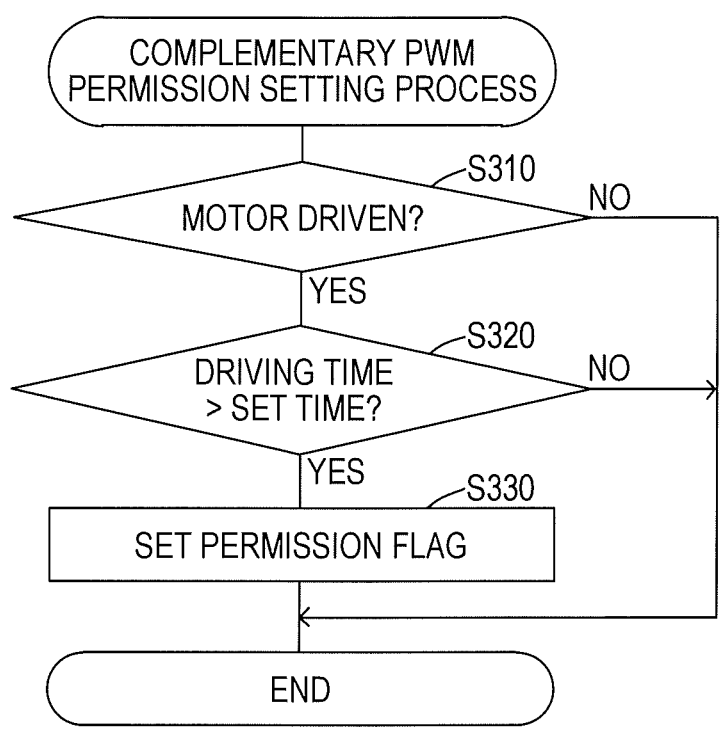
FIG. 5 is a flowchart representing a complementary PWM permission setting process to be executed by the control circuit.

The complementary PWM permission setting process, in the present embodiment, is executed by procedures shown in FIG. 5

In the complementary PWM permission setting process, first in S310, whether or not the motor 10 is currently driven is determined. If the motor 10 is driven, the process proceeds to S320. In S320, whether motor driving time (in particular, elapsed time since the motor 10 starts to be driven) exceeds a predetermined set time is determined.

To the set time described above, time required for a regenerative current to be no longer generated from when the trigger SW 22 is turned on and the motor 10 starts to be driven during deceleration operation of the motor 10 is set in advance. The time is set in advance by experiment or simulation. If the motor 10 is not in deceleration operation, i.e., if the motor 10 is driven from a state in which rotation of the motor 10 is stopped, the set time is zero since no regenerative current is generated.

When it is determined in S320 that the motor driving time exceeds the set time, the process proceeds to S330. In S330, the complementary PWM permission flag is set. Then, the complementary PWM permission setting process is terminated. When driving of the motor 10 is started from a state in which rotation of the motor 10 is stopped, the complementary PWM permission flag is immediately set since the set time is zero.

If it is determined either in S310 that the motor 10 is not driven, or in S320 that the motor driving time has not exceeded the set time, the complementary PWM permission setting process is terminated without execution of the processing in S330.

When the complementary PWM permission setting process is executed as such, the control circuit 36 determines in S260 whether the complementary PWM permission flag is set. If it is determined that the complementary PWM permission flag is not set, the process proceeds to S270. In S270, the motor drive process for driving the motor 10 is executed by the non-complementary PWM. Then, the motor control process is terminated.

In the motor drive process using the non-complementary PWM (S270), interruption processing that is executed at every edge of the Hall signal (every rotation of electrical angle of 60 degrees of the motor 10) controls an ON/OFF state of the high-side switch and the low-side switch set as switching elements for forming a current path.

Figure 6:
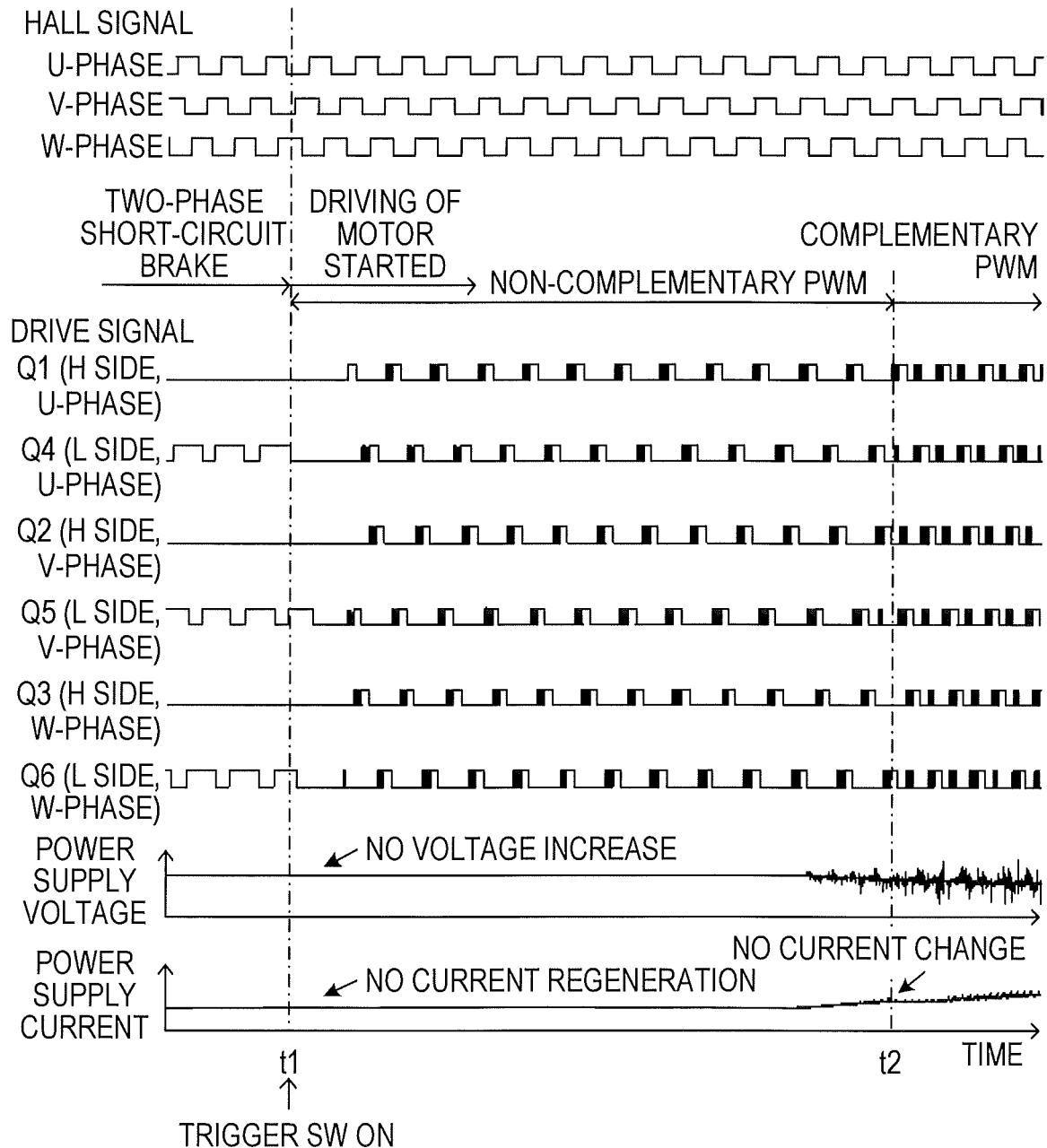
FIG. 6 is a time chart showing change in switching operation of PWM control, a power supply voltage, and a power supply current.
Figure 7:
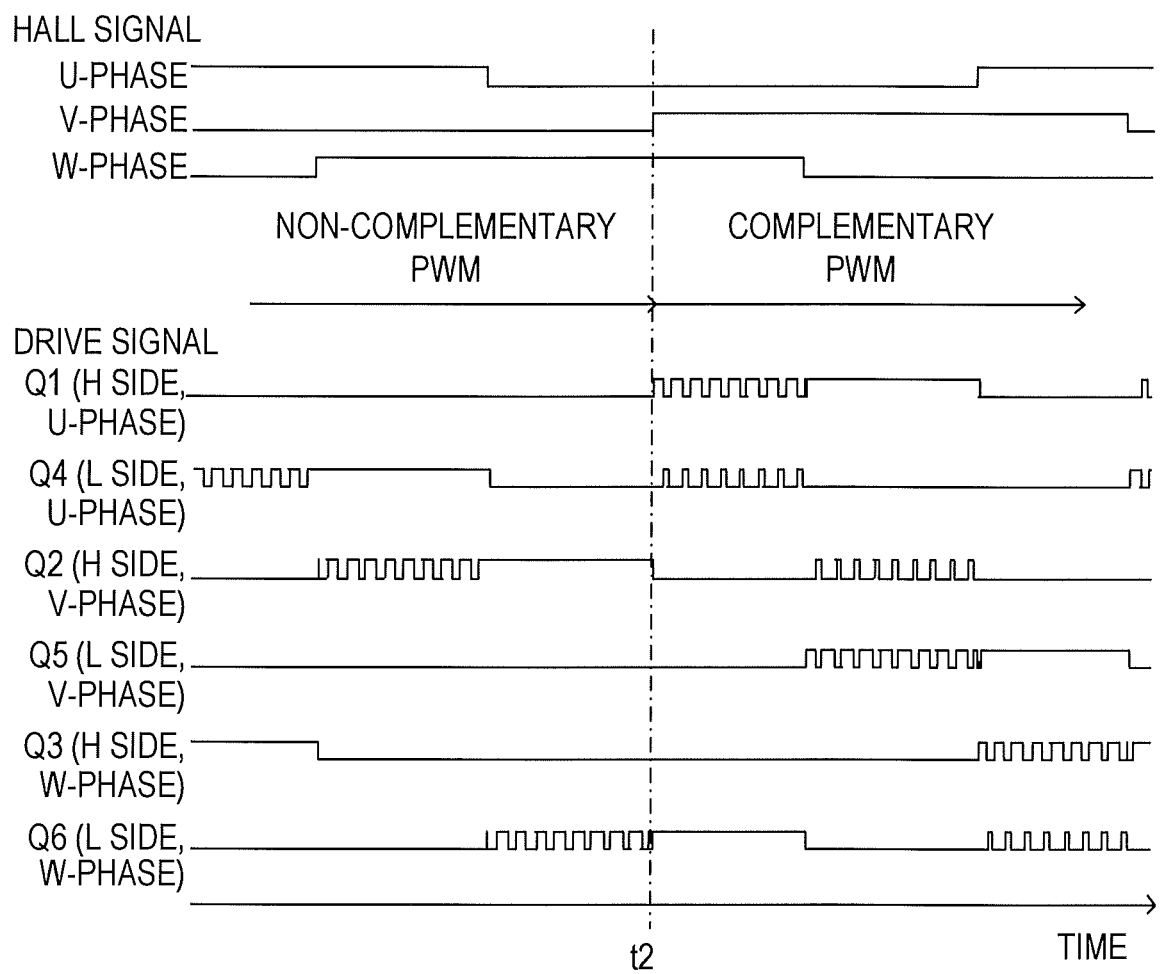
FIG. 7 is a time chart showing change in drive signal at switching timing of the PWM control.

As shown in FIGS. 6 and 7, in the PWM control of the three-phase brushless motor as in the present embodiment, the current path to the motor 10 is switched each time the motor 10 rotates electrical angle of 60 degrees based on the Hall signals, and electric current flowing through the current path is controlled by the PWM signal.

In the non-complementary PWM, one of the high-side switch and the low-side switch selected as the current path to the motor 10 is held in the ON state and the other is alternately turned on/off periodically by the PWM signal having a predetermined duty ratio.

Therefore, in S270, first, a duty ratio for controlling electric current supplied to the motor 10 is calculated so that the motor 10 is rotated in accordance with the operation amount of the trigger 7.

Then, a control signal for holding one of the two switching elements forming the current path to the motor 10 in the ON state and for turning on/off the other by the PWM signal corresponding to the calculated duty ratio described above is output toward the gate circuit 34.

In FIG. 6, for each rotation of electrical angle of 60 degrees of the motor 10, the switching elements Q1 and Q5, the switching elements Q5 and Q3, the switching elements Q3 and Q4, the switching elements Q4 and Q2, the switching elements Q2 and Q6, and the switching elements Q6 and Q1 are sequentially selected as the switching elements to form the current path.

Then, by the processing in S270, the former of the selected two switching elements is held in the ON state, and the latter is turned on/off by the PWM signal.

In S260, when it is determined that the complementary PWM permission flag is set, the process proceeds to S280. In S280, whether the present moment is immediately after the complementary PWM permission flag is set is determined. In other words, it is determined whether the present moment is the timing to switch the PWM control to the complementary PWM.

If it is determined that the present moment is the timing to switch to the complementary PWM, the process proceeds to S290. In S290, the duty ratio (driving duty) of the PWM signal to turn on/off the switching elements in the bridge circuit 32 is corrected. Then, the process proceeds to S300.

If it is determined that the present moment is not the timing to switch to the complementary PWM, the process proceeds to S 300 without moving to S290. If the control by the complementary PWM has already started, it is determined in S280 that the present moment is not the timing to switch to the complementary PWM.

In S300, the motor drive process for driving the motor 10 is executed by using the complementary PWM. Then, the motor control process is terminated.

In the motor drive process using the complementary PWM, similar to the non-complementary PWM, one of the two switching elements that are selected as the switching elements forming the current path is held in the ON state, and the other is alternately turned on/off by the PWM signal. In addition, the following control is executed.

That is, inside the bridge circuit 32, another switching element connected to the same terminal of the motor 10 as the other of the switching elements that is turned on/off by the PWM signal is turned on/off so that its ON/OFF state is reverse to that of the other of the switching elements.

For example, in the non-complementary PWM, the switching elements Q1 and Q5, the switching elements Q5 and Q3, the switching elements Q3 and Q4, the switching elements Q4 and Q2, the switching elements Q2 and Q6, and the switching elements Q6 and Q1 are sequentially selected in synchronization with the Hall signals, and the latter switching elements Q5, Q3, Q4, Q2, Q6, and Q1 are turned on/off by the PWM signal.

In the complementary PWM, further, the switching elements Q2, Q6, Q1, Q5, Q3, and Q4 connected in series to the switching elements Q5, Q3, Q4, Q2, Q6, and Q1 for current control are successively selected as switching elements for the complementary PWM (see FIGS. 6 and 7).

Then, the selected switching elements Q2, Q 6, Q1, Q5, Q3, and Q4 for complementary PWM are turned on/off by the PWM signal having a reverse phase of which logic is reverse to that of the PWM signal input to the switching elements for current control (see FIG. 7).

In the complementary PWM, the high-side switch and the low-side switch, which are connected in series between the power supply line and the ground line, are alternately turned on inside the bridge circuit 32. Therefore, there is a possibility that each switch is turned on at the same time.

For this reason, the gate circuit 34, when alternately turning on the above two switches, sets dead time for temporarily setting the drive signal to the same level (low level), so that the two switches are not to be turned on at the same time upon switching the drive signal to each of the switches.

However, when the dead time is set as such, the ON time of the switching element to be turned on/off for current control is varied by an amount of the dead time when the control is switched from the non-complementary PWM to the complementary PWM. Electric current flowing to the motor may be varied.

Therefore, in the present embodiment, when the control of the motor 10 is switched from the non-complementary PWM to the complementary PWM, the duty ratio (driving duty) of the PWM signal is corrected in S290 so that the ratio of the ON/OFF time is not to be changed. That is, in S 290, variation in the ON time of the switching elements for power supply that are turned on/off by the PWM signal due to the dead time set by the gate circuit 34 is suppressed.

As described above, in the electric power tool 1 of the present embodiment, the drive system of the motor 10 is switched to the non-complementary PWM or the complementary PWM depending on whether the complementary PWM permission flag is set when the trigger SW 22 is turned on.

The complementary PWM permission flag is cleared when the trigger SW 22 is in the OFF state and the motor 10 is stopped or decelerated. Thus, when the trigger 7 is operated, driving of the motor 10 is started by the non-complementary PWM. For example, when the trigger 7 is operated after the motor 10 is decelerated and before the rotation of the motor 10 is stopped, negative determination is made in S260 based on the complementary PWM permission flag that is cleared during deceleration operation. Therefore, in a state in which the motor 10 is rotating, driving of the motor 10 is started by the non-complementary PWM (S270).

Then, when elapsed time (motor driving time) after driving of the motor 10 is started exceeds the set time, the complementary PWM permission flag is set, and the control of the motor 10 is switched to the complementary PWM from the non-complementary PWM.

For example, as shown in FIG. 6, when the trigger SW 22 at time t1 is turned on and the driving of the motor 10 is started while the motor 10 is decelerated by brake control (two-phase short-circuit brake in the figure), the non-complementary PWM is always selected.

Figure 8:
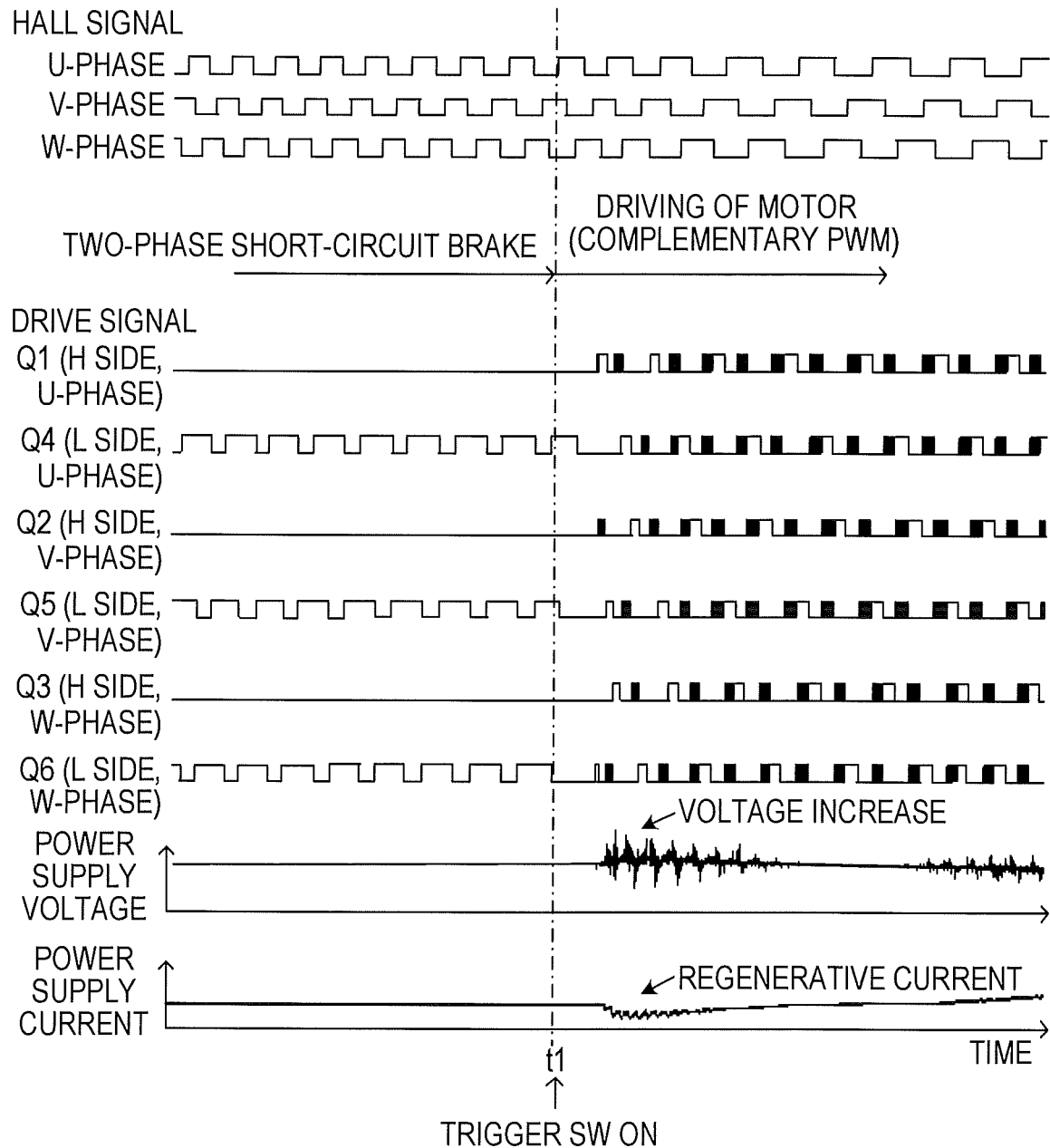
FIG. 8 is a time chart showing change in the power supply voltage and current of a conventional device for driving a motor in complementary PWM.

Thus, according to the electric power tool 1 of the present embodiment, unlike the conventional example shown in FIG. 8, the driving of the motor 10 is not started by the complementary PWM, when the trigger 7 is operated at the time t1 during the rotation of the motor 10.

Therefore, when the switching element for the complementary PWM is in the ON state due to the driving of the motor 10 being started by the complementary PWM, flowing of a braking current in a reverse direction to a direction to generate a driving force to the motor 10 inside the bridge circuit 32 can be suppressed.

Therefore, according to the electric power tool 1 of the present embodiment, flowing of a braking current in the bridge circuit 32, regeneration of a braking current to the battery 30 which is a DC power supply as a regenerative current, and increase in power supply voltage can be suppressed upon starting to drive the motor 10.

Further, in the present embodiment, when the predetermined set time as the time required for a regenerative current to no longer flow after the driving of the motor 10 is started elapses, the control of the motor 10 is switched to the complementary PWM from the non-complementary PWM.

For this reason, temperature rise of the switching elements Q1 to Q6, and hence the bridge circuit 32, due to heat generated by the diodes D1 to D6 provided to the switching elements Q1 to Q6, can be suppressed.

Further, at the time of switching to the complementary PWM from the non-complementary PWM, the duty ratio of the PWM signal is corrected so that the ON time of the switching element for current control, which is turned on/off by the PWM signal, is not to be changed by the dead time.

Thus, according to the present embodiment, switching the control of the motor 10 from the non-complementary PWM to the complementary PWM can suppress the change in electric current flowing to the motor 10.

Although an embodiment of the present disclosure has been described in the above, the present disclosure is not intended to be limited to the above disclosed embodiment, and may take a variety of modes within the scope not departing from the gist of the present disclosure.

In the above embodiment, when the motor 10 is driven and the elapsed time after the driving is started exceeds the set time in the complementary PWM permission setting process, the control circuit 36 determines that the switching condition to the complementary PWM is satisfied and sets the complementary PWM permission flag.

Figure 9:
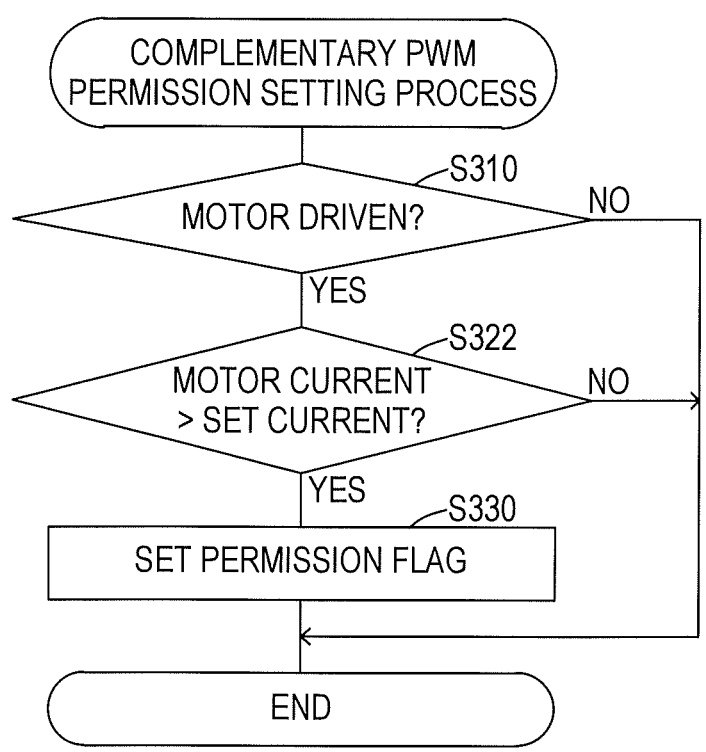
FIG. 9 is a flowchart showing a first modification of the complementary PWM permission setting process.
Figure 10:
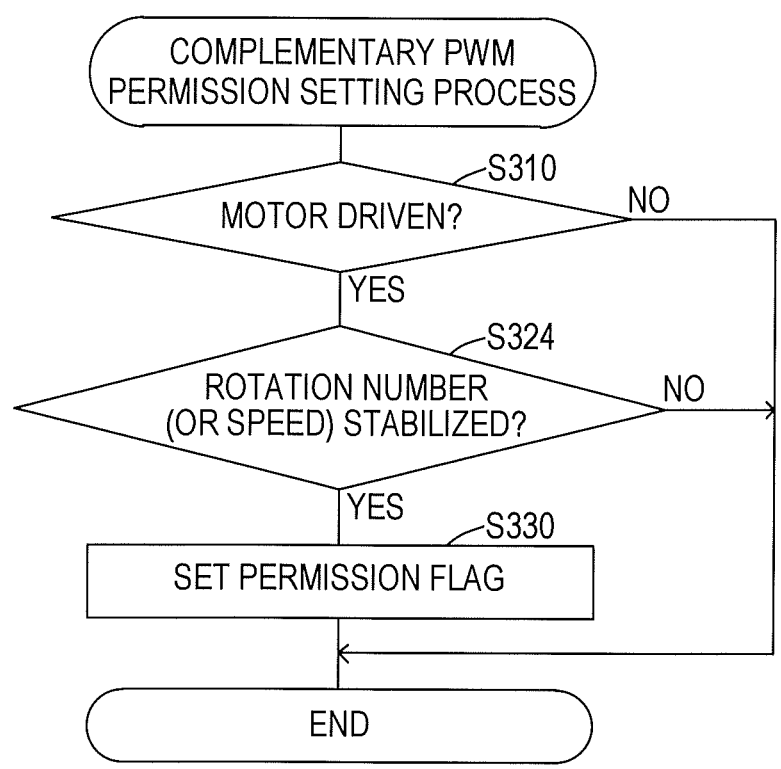
FIG. 10 is a flowchart showing a second modification of the complementary PWM permission setting process.
Figure 11:
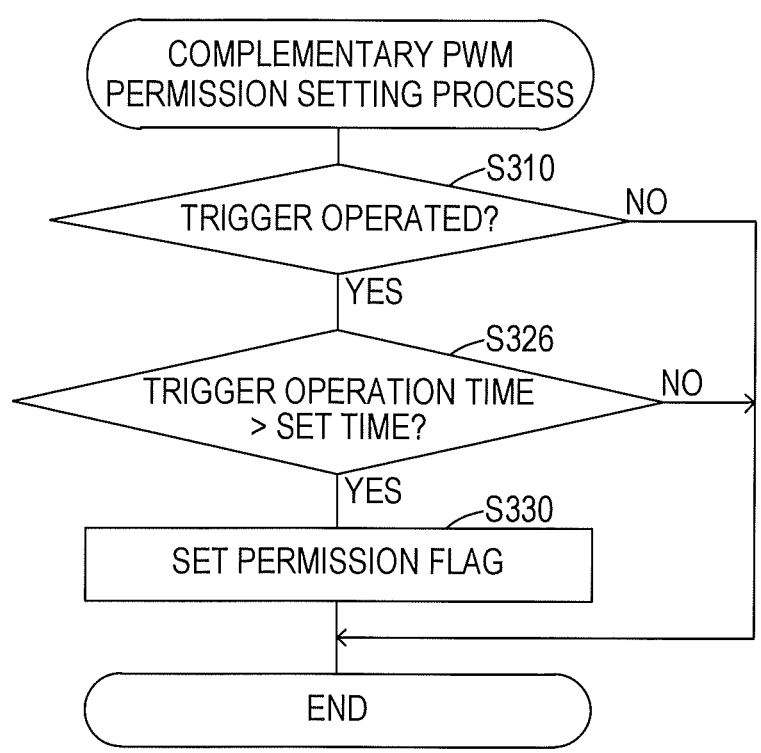
FIG. 11 is a flowchart showing a third modification of the complementary PWM permission setting process.

In contrast, the complementary PWM permission setting process may be executed by procedures of first to third modifications shown in FIGS. 9 to 11.

In the complementary PWM permission setting process of the first modification shown in FIG. 9, it is determined during the driving of the motor 10 (S310: YES) whether the motor current exceeds a predetermined set current (S322). When the motor current exceeds the set current, it is determined that an execution condition of the complementary PWM is satisfied, and a permission flag is set (S330).

In the complementary PWM permission setting process of the second modification shown in FIG. 10, it is determined during the driving of the motor 10 (S310: YES) whether the number of rotation (speed) of the motor 10 is no longer changed (S324). In other words, whether the rotation of the motor 10 is stabilized is determined (S324). If the number of rotation of the motor 10 is not changed, it is determined that an execution condition of the complementary PWM is satisfied, and the complementary PWM permission flag is set (S330). That the number of rotation (speed) of the motor 10 is no longer changed means that the number of rotation of the motor 10 is stabilized at a rotation speed corresponding to the operation amount of the trigger 7. In other words, it means that the rotation speed of the motor 10 is stabilized at a rotation speed corresponding to the duty ratio of the PWM signal, which is greater than the rotation speed at the time when driving of the motor 10 is started. Therefore, in S324, it may be understood that whether the rotation speed of the motor 10 is greater than the rotation speed at the time when driving of the motor 10 is started is determined.

In the complementary PWM permission setting process in the third modification shown in FIG. 11, it is determined whether the trigger 7 is operated (S310). If the trigger 7 is operated, the process proceeds to S326. In S326, whether the operation time of the trigger 7 exceeds a predetermined set time is determined. If the operation time exceeds the set time, it is determined that the switching condition to the complementary PWM is satisfied, and the complementary PWM permission flag is set (S330).

Thus, in the first to third modifications, it is determined whether the switching condition to the complementary PWM is satisfied based on electric current flowing to the motor 10, the number of rotation (speed) of the motor 10, or the operation time of the trigger 7, respectively.

The above determination is a process for detecting that the motor 10 is controlled by the non-complementary PWM after the trigger 7 is operated, and the rotation state of the motor 10 (in other words, electric current flowing to the motor 10) has become a rotation state corresponding to the duty ratio of the PWM signal in the non-complementary PWM.

Therefore, even if the complementary PWM permission setting process is executed in the procedures shown in FIGS. 9 to 11, the same effect as the above embodiment can be achieved.

In the complementary PWM permission setting process, the control circuit 36 may be configured to switch the control of the motor 10 when one or all of a plurality of switching conditions is satisfied by executing all the processing in S320, S322, S324, and S326, or processing corresponding to partial combination thereof.

Figure 12:
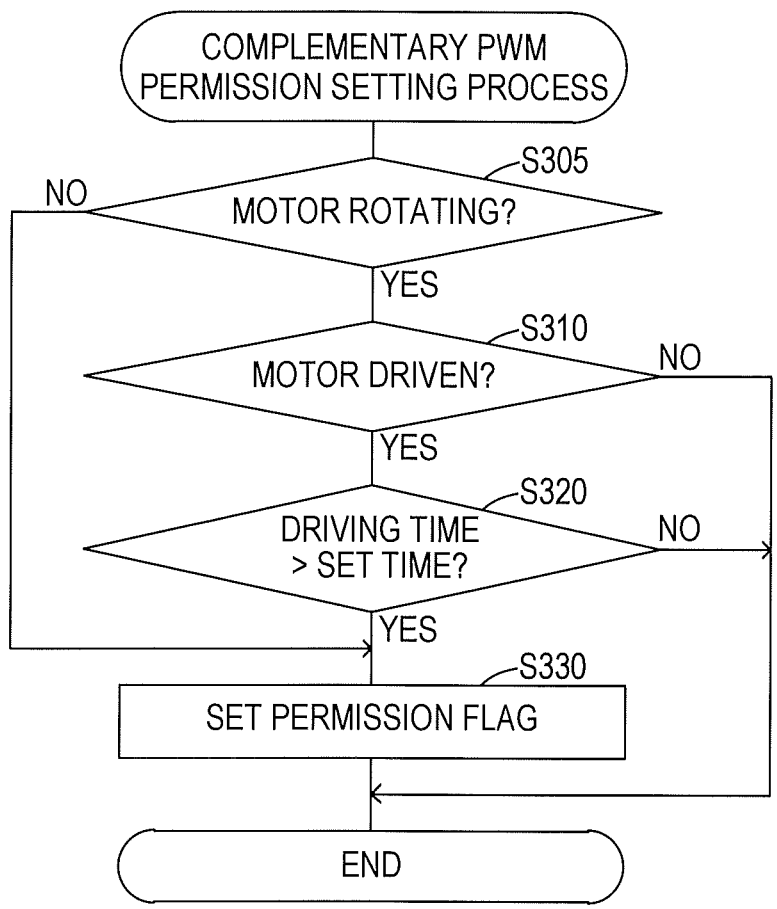
FIG. 12 is a flowchart showing a fourth modification of the complementary PWM permission setting process.

The complementary PWM permission setting process may be executed by procedures shown in FIG. 12. In the complementary PWM permission setting process of a fourth modification shown in FIG. 12, it is first determined whether the motor 10 is rotating (S305). When the motor 10 is rotating, the processing in S310, S320 and S330 are executed similarly to the above embodiments. If the motor 10 is not rotating, the complementary PWM permission flag is set in S330. That is, in the fourth modification, when the trigger 7 is operated and if the motor 10 is not rotating, the complementary PWM is executed. According to the fourth modification, when the motor 10 is not rotating, the control circuit 36 skips the determinations in S310 and S320, and the complementary PWM permission flag is set. Thus, the complementary PWM can be quickly executed. The processing in S305 may be added to the complementary PMW permission setting process in the first, second, and third modifications.

The electric power tool 1 that has been described in the above-described embodiments is a reciprocating saw. However, electric power tools to which the present disclosure is applicable include general electric power tools such as drill drivers, impact drivers, grinders, etc. and, of course, electric power tools for gardening, such as brush cutters, chain saws, etc. for cutting grass and small-diameter trees.

The present disclosure may be applied to an electric power tool having a battery as a DC power source, and may be applied to an electric power tool that operates by receiving power supply from an external DC power source such as an AC/DC adapter. Alternatively, the present disclosure may be applied to an electric power tool which operates by receiving power supply from an AC power source such as a commercial power source.

Further, the present disclosure is not limited to application to electric power tools. The present disclosure is applicable to any devices that drives and controls a motor using a bridge circuit. Application of the present disclosure can bring the same effect as the above embodiments to these devices.

In the above embodiments, the three-phase brushless motor is controlled. However, the present disclosure is applicable to any control device that controls electric current flowing to a motor via a bridge circuit that comprises a high-side switch and a low-side switch. The motor may be a two-phase motor, or may be a motor having more phases. Any control devices that control these motors via a bridge circuit can achieve the same effect by application of the present disclosure in the same manner as in the above embodiments.

What is claimed is:
1. An electric power tool comprising:
an operation unit configured to input a drive command to a motor having a plurality of terminals;
a bridge circuit having a plurality of switching elements provided between positive and negative electrodes of a direct current (DC) power source and the plurality of terminals of the motor; and
a control unit configured to PWM control electric current flowing to the motor when the drive command is input from the operation unit, the control unit, depending on a rotation position of the motor, selecting from among the plurality of switching elements a pair of switching elements forming a current path of the motor extending from the positive electrode to the negative electrode of the DC power source inside the bridge circuit, the control unit turning on one of the pair of switching elements, and alternately turning on/off by a PWM signal a second of the pair of switching elements,
the control unit being configured to selectively execute one of non-complementary PWM and complementary PWM as the PWM control,
the control unit, in the complementary PWM, alternately turning on/off a plurality of times by the PWM signal the second of the pair of switching elements, among the plurality of switching elements inside the bridge circuit, and turning on/off a third switching element connected to the same terminal of the motor as the second of the pair of switching elements so that an on/off state of the third switching element is reversed to that of the second of the pair of switching elements,
the control unit, in the non-complementary PWM, alternately turning on/off a plurality of times by the PWM signal only the second of the pair of switching elements, among the plurality of switching elements inside the bridge circuit, while the third switching element is held to be off, the control unit being configured, when the operation unit is operated, to execute the non-complementary PWM when the motor is rotating, and to execute the complementary PWM when the motor is not rotating, and the control unit being configured, when the control of the motor is switched from the non-complementary PWM to the complementary PWM, to correct a duty ratio of the PWM signal in the complementary PWM of immediately after switching, so that the ratio of on/off time of the second of the pair of switching elements is not to be changed from a ratio of immediately before switching.

2. The electric power tool according to claim 1, wherein the control unit is configured to switch the control of the motor to the complementary PWM, when a switching condition to the complementary PWM is satisfied during the non-complementary PWM control of the motor.

3. The electric power tool according to claim 2, wherein the control unit is configured to determine that the switching condition is satisfied when driving time of the motor is longer than a set time, and switch the control of the motor to the complementary PWM.

4. The electric power tool according to claim 2, wherein the control unit is configured to determine that the switching condition is satisfied when elapsed time since the drive command is input from the operation unit is longer than a set time, and switch the control of the motor to the complementary PWM.

5. The electric power tool according to claim 2, wherein the control unit is configured to determine whether the switching condition is satisfied based on electric current flowing to the motor.

6. The electric power tool according to claim 5, wherein the control unit is configured to determine that the switching condition is satisfied when electric current flowing to the motor becomes equal to or greater than a preset threshold current, and switch the control of the motor to the complementary PWM.

7. The electric power tool according to claim 2, wherein the control unit is configured to determine whether the switching condition is satisfied based on a rotation speed of the motor.

8. The electric power tool according to claim 7, wherein the control unit is configured to determine that the switching condition is satisfied when the rotation speed of the motor becomes greater than a rotation speed at the time when the motor starts to be driven, and switch the control of the motor to the complementary PWM.

9. The electric power tool according to claim 1, wherein the control unit being configured, when the control of the motor is switched from the complementary PWM to the non-complementary PWM, to correct a duty ratio of the PWM signal in the non-complementary PWM of immediately after switching so that the ratio of on/off time of the second of the pair of switching elements is not to be changed from a ratio of immediately before switching.

10. An electric power tool comprising:
an operation unit configured to input a drive command to a motor having a plurality of terminals;
a bridge circuit having a plurality of switching elements provided between positive and negative electrodes of a direct current (DC) power source and the plurality of terminals of the motor; and
a control unit configured to PWM control electric current flowing to the motor when the drive command is input from the operation unit, the control unit, depending on a rotation position of the motor, selecting from among the plurality of switching elements a pair of switching elements forming a current path of the motor extending from the positive electrode to the negative electrode of the DC power source inside the bridge circuit, the control unit turning on one of the pair of switching elements, and alternately turning on/off by a PWM signal a second of the pair of switching elements, the control unit being configured to selectively execute one of non-complementary PWM and complementary PWM as the PWM control, the control unit, in the complementary PWM, alternately turning on/off a plurality of times by the PWM signal the second of the pair of switching elements, among the plurality of switching elements inside the bridge circuit, and turning on/off a third switching element connected to the same terminal of the motor as the second of the pair of switching elements so that an on/off state of the third switching element is reversed to that of the second of the pair of switching elements, the control unit, in the non-complementary PWM, alternately turning on/off a plurality of times by the PWM signal only the second of the pair of switching elements, among the plurality of switching elements inside the bridge circuit, while the third switching element is held to be off, the control unit being configured to (1) execute the non-complementary PWM if a command to accelerate rotation of the motor is input from the operation unit to the motor as the drive command and (2) switch control of the motor from the complementary PWM to the non-complementary PWM if one of a command to stop and a command to decelerate the rotation of the motor is input from the operation unit to the motor, and the control unit being configured, when the control of the motor is switched from the non-complementary PWM to the complementary PWM, to correct a duty ratio of the PWM signal in the complementary PWM of immediately after switching, so that the ratio of on/off time of the second of the pair of switching elements is not to be changed from a ratio of immediately before switching.

11. The electric power tool according to claim 10, wherein the control unit is configured to determine whether the motor is rotating if the command to accelerate the rotation of the motor is input from the operation unit, and is configured to execute the non-complementary PWM upon a determination that the motor is rotating, and to execute the complementary PWM upon a determination that the motor is not rotating.

12. The electric power tool according to claim 11, wherein the control unit is configured, upon the determination that the motor is rotating, to switch the control of the motor from the non-complementary PWM to the complementary PWM according to a driven state of the motor.

13. The electric power tool according to claim 12, wherein the control unit is configured to determine the driven state based on a driving time, and is configured to execute the non-complementary PWM until the driving time becomes greater than a set time, and to execute the complementary PWM after the driving time becomes greater than the set time.

14. The electric power tool according to claim 12, wherein the control unit is configured to determine the driven state based on a driving current, and is configured to execute the non-complementary PWM until the driving current becomes greater than a set current, and to execute the complementary PWM after the driving current becomes greater than the set current.

15. The electric power tool according to claim 12, wherein the control unit is configured to determine the driven state based on a rotation speed of the motor, and is configured to execute the non-complementary PWM until the rotation speed is stabilized, and to execute the complementary PWM after the rotation speed is stabilized.

16. The electric power tool according to claim 10, wherein the control unit being configured, when the control of the motor is switched from the complementary PWM to the non-complementary PWM, to correct a duty ratio of the PWM signal in the non-complementary PWM of immediately after switching so that the ratio of on/off time of the second of the pair of switching elements is not to be changed from a ratio of immediately before switching.

17. An electric power tool comprising:
an operation unit configured to input a drive command to a motor having a plurality of terminals;
a bridge circuit having a plurality of switching elements provided between positive and negative electrodes of a direct current (DC) power source and the plurality of terminals of the motor; and
a control unit configured to PWM control electric current flowing to the motor when the drive command is input from the operation unit, the control unit, depending on a rotation position of the motor, selecting from among the plurality of switching elements a pair of switching elements forming a current path of the motor extending from the positive electrode to the negative electrode of the DC power source inside the bridge circuit, the control unit turning on one of the pair of switching elements, and alternately turning on/off by a PWM signal a second of the pair of switching elements,
the control unit being configured to selectively execute one of non-complementary PWM and complementary PWM as the PWM control,
the control unit, in the complementary PWM, alternately turning on/off a plurality of times by the PWM signal the second of the pair of switching elements, among the plurality of switching elements inside the bridge circuit, and turning on/off a third switching element connected to the same terminal of the motor as the second of the pair of switching elements so that an on/off state of the third switching element is reversed to that of the second of the pair of switching elements,
the control unit, in the non-complementary PWM, alternately turning on/off a plurality of times by the PWM signal only the second of the pair of switching elements, among the plurality of switching elements inside the bridge circuit, while the third switching element is held to be off, and
the control unit being configured, when control of the motor is switched from one of the non-complementary PWM and the complementary PWM as a first PWM control to another of the non-complementary PWM and the complementary PWM as a second PWM control, to correct a duty ratio of the PWM signal in the second PWM control immediately after switching from the first PWM control to the second PWM control, so that a first ratio of on/off time of the second of the pair of switching elements immediately after the switching is not changed from a second ratio of on/off time of the second of the pair of switching elements immediately before the switching.

* * * * *